United States Patent
Srivastava et al.

(10) Patent No.: US 7,185,339 B2
(45) Date of Patent: Feb. 27, 2007

(54) VICTIM SELECTION FOR DEADLOCK DETECTION

(75) Inventors: Alok Kumar Srivastava, Santa Clara, CA (US); Wilson Wai Shun Chan, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 931 days.

(21) Appl. No.: 09/922,424

(22) Filed: Aug. 3, 2001

(65) Prior Publication Data

US 2003/0028638 A1    Feb. 6, 2003

(51) Int. Cl.
*G06F 9/46* (2006.01)
(52) U.S. Cl. ...................................................... 718/104
(58) Field of Classification Search ................. 718/104
See application file for complete search history.

(56) References Cited

U.S. PATENT DOCUMENTS

| | | | | |
|---|---|---|---|---|
| 4,965,716 A | * | 10/1990 | Sweeney ..................... | 710/112 |
| 5,682,537 A | * | 10/1997 | Davies et al. ................ | 710/200 |
| 5,835,766 A | * | 11/1998 | Iba et al. ..................... | 718/104 |
| 6,021,113 A | * | 2/2000 | Doshi et al. ................. | 370/228 |
| 6,332,023 B1 | * | 12/2001 | Porter et al. ................. | 379/242 |

FOREIGN PATENT DOCUMENTS

| EP | 0 595 453 A1 | 5/1994 |
|---|---|---|
| WO | WO 99/28837 A1 | 6/1999 |

OTHER PUBLICATIONS

A data Sharing tutorial, Jurt Ziegler, Jr. 1997, pp. 3-7.*
Marina Roesler, et al., "Efficient Deadlock Resolution for Lock—Based Concurrency Control Schemes," 1988, IEEE, pp. 224-233.

* cited by examiner

*Primary Examiner*—Meng-Al T. An
*Assistant Examiner*—Camquy Truong
(74) *Attorney, Agent, or Firm*—Hickman Palermo Truong & Becker LLP

(57) ABSTRACT

A mechanism and system are described for either releasing held resources in the case of a deadlock or to postpone requests for resources when a potential deadlock is detected. One technique involves a three pass algorithm for selecting a candidate, where the candidate is either a possessory entity or resource is used. The three passes are as follows: (1) determining the subset of candidates, which have the CAN-BE-VICTIM flag set on; (2) If pass one results in a subset with more than one candidates in it, process that subset to determine a second subset of candidates based on resource priority associated with a resource type; (3) If the second pass results in a subset with more than one candidate in it, process that subset to select the candidate that has been running or held the shortest length of time.

32 Claims, 3 Drawing Sheets

VICTIM SELECTION FOR DEADLOCK DETECTION

FIELD OF THE INVENTION

The present invention relates to distributed computer systems, and in particular to victim selection when a deadlock or potential deadlock is detected.

BACKGROUND OF THE INVENTION

One of the long-standing challenges in computing is dealing with deadlocks. A deadlock occurs if a set of entities exists such that each entity in the set is waiting for the release of at least one resource owned by another entity in the set. Entities capable of owning a resource are referred to herein as possessory entities. In the context of a database system, for example, entities include among other things, processes and transactions. A transaction is an atomic unit of work.

For example, a transaction T1 may seek exclusive ownership of resources R1 and R2. If R1 is available and R2 is currently exclusively owned by another transaction T2, then transaction T1 may acquire exclusive ownership of R1 but must wait for R2 to become available. A deadlock will occur if transaction T2 seeks ownership of R1, and T2 is suspended to wait for R1 without releasing R2. Because both T1 and T2 are waiting for each other, they are deadlocked.

Computer systems employ a variety of deadlock handling mechanisms (deadlock handlers) that detect deadlocks. The process of resolving the deadlock involves first determining if there is a deadlock and second determining how to resolve the deadlock. A couple of techniques for dealing with a deadlock include a wait-for graph technique and a time-out technique.

The wait-for graph technique detects deadlocks based on "cycles". Specifically, after a process requests a resource, or waits more than threshold period of time for a resource, a wait-for graph may be generated and examined for any cycles. If any cycles are identified, then the deadlock detection mechanism has identified a potential deadlock. A resource that is part of the deadlock cycle is then selected for use in resolving the deadlock. The resource thus selected is referred to herein as the "victim resource" because the entity that possesses or is requesting the resource will typically incur a performance penalty when steps are taken to resolve the deadlock. Similarly, the entity that possesses or is requesting the victim resource is referred to herein as the "victim entity". The term "victim" is used herein to refer to either the victim resource or the victim entity.

Typically, the victim resource is the resource, within the cycle, which is held by the entity whose request resulted in a deadlock. One way in which to resolve the deadlock is to cause the lock on the victim resource to be released. The lock on the victim resource may be released in a variety of ways. For example, when the victim entity is a transaction, canceling the request for the resource that resulted in deadlock status is coupled with a rollback, which results in the release of resources held by the transaction. The transaction may then attempt to re-acquire the resources and re-perform the steps that were rolled back. This re-performing of steps may be done automatically or initiated based on customer input.

A wait-for graph is a graph that shows what entities possess resources, and what entities are waiting on resources. In the figures, the term "WAITING" indicates that the entity is in a "wait state" waiting for a resource and therefore the entity is not "RUNNING". Examples of wait-for graphs are shown in FIGS. 1a and 1b. FIG. 1a depicts the following scenario:

1) Entity 110 has resource R1;
2) Entity 120 has resource R2 and needs resource R1. So Entity 120 queues up behind Entity 110 and goes into a wait state, waiting for Entity 110 to finish using resource R1;
3) Entity 130 has resource R3 and needs resource R2. So Entity 130 queues up behind Entity 120 and goes into a wait state, waiting for Entity 120 to finish using resource R2;
4) Entity 140 has resource R4 and needs resource R3. So Entity 140 queues up behind Entity 130 and goes into a wait state, waiting for Entity 130 to finish using resource R3;
5) Entity 150 has resource R5 and needs resource R4; So Entity 150 queues up behind Entity 140 and goes into a wait state, waiting for Entity 140 to finish using resource R4;
6) Entity 160 has no resource but it needs resource R5; Since Entity 150 already has resource R5, Entity 160 queues up behind Entity 150, goes into a wait state, waiting for Entity 150 to finish using resource R5;
7) Entity 110 also needs resource R5; Entity 160 is already waiting for resource R5; So Entity 110 queues up behind Entity 160, goes into a wait state, waiting for Entity 160 to finish using R5.

Another way of depicting a wait-for graph is by having the nodes be the resources and the arrows be the possessory entities. FIG. 1b depicts such a graph where R1, R2, R3, R4, R5, R6, R7, R8 are resources and the arrows E1, E2, E3, R4, E5, E6, E7, E8 are possessory entities. The arrow points from the resource that the possessory entity is holding. The arrow points to the resource that the possessory entity is requesting. Therefore, in FIG. 1b:

1) Entity E1 holds R1 and is requesting R2;
2) Entity E2 holds R2 and is requesting R3;
3) Entity E3 holds R3 and is requesting R4;
4) Entity E4 holds R4 and is requesting R1 and R5;
5) Entity E5 holds R5 and is requesting R6;
6) Entity E6 holds R6 and is requesting R7;
7) Entity E7 holds R7 and is requesting R8; and
8) Entity E8 holds R8 and is requesting R1.

A deadlock situation is depicted by the cycle of entities and resources in FIGS. 1a and 1b. All of the entities in FIGS. 1a and 1b are waiting for resources and none of these entities is relinquishing resources so that another entity may proceed. Something has to be done to break the cycle. In FIG. 1a, Entity 110 was the last entity to request a resource and this request resulted in the cycle, therefore the resources that Entity 110 is holding will arbitrarily be selected for release. The problem is that the resources Entity 110 is holding may not be good candidates for release.

Under the time-out technique, a possessory entity is presumed to be involved in a deadlock once the possessory entity waits a threshold period of time to obtain ownership of a resource. The time-out technique is less accurate in detecting deadlocks, since delays in obtaining ownership of a resource may result from many causes other than deadlock.

Unfortunately, selecting the resource victim to be either (1) the most recently requested resource involved in a deadlock cycle, or (2) the resource requested by an entity that "times out", may result in significant overhead. For example, in either case, the victim entity could be a long-running transaction that is nearly complete. Where a victim entity is a transaction, it necessary to re-execute the entire transaction. Terminating such an entity is particularly wasteful when the deadlock could be broken in some other manner using minimal overhead.

Based on the foregoing, it is desirable to provide a more efficient method of breaking a detected deadlock.

SUMMARY OF THE INVENTION

A mechanism and system are described for selecting a victim when a potential deadlock is detected. According to one embodiment, the selection process is performed in three passes as follows:

1) During pass one, determine, from a set of candidates involved in a deadlock, a subset of candidates that have a CAN-BE-VICTIM flag set to a value that indicates that the candidates are allowed to be selected as the victim;

2) If pass one results in a subset with more than one candidates in it, then during pass two that subset is processed to determine a second subset of candidates based on resource priority associated with a resource type; and 3) If the second pass results in a subset with more than one candidate in it, then that subset is processed to select the candidate that has been running or held the shortest length of time.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1A:
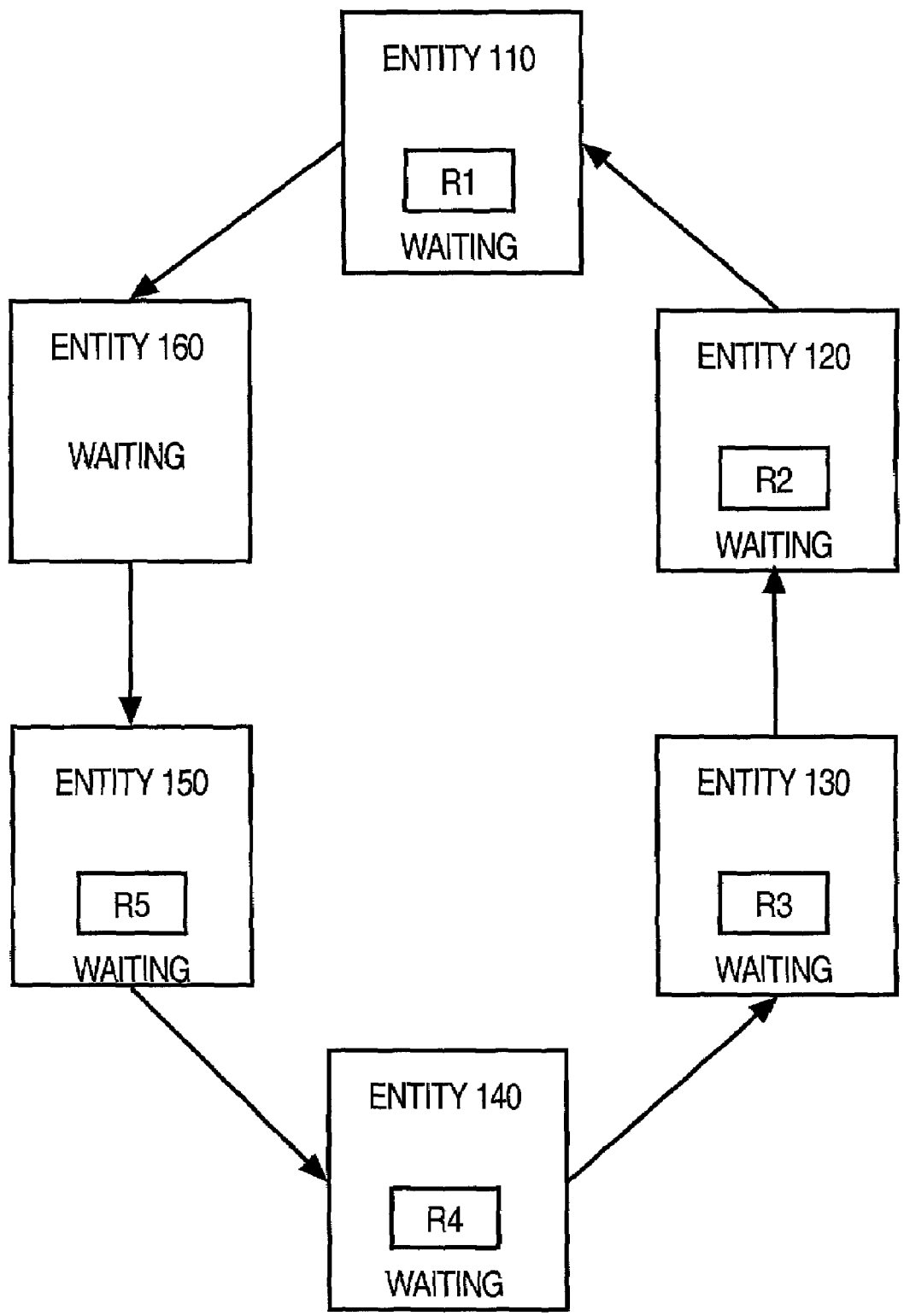
FIG. 1a is a block diagram depicting a wait-for graph.

A method and apparatus are described for selecting a victim in response to detecting a deadlock or potential deadlock. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview

A mechanism and system are described for selecting a victim when a potential deadlock is detected. A resource may not be a good candidate to be the victim resource selected in response to detecting a deadlock for several reasons. For example, the possessory entity holding the resource may be a high priority process or transaction, which needs to run to completion as soon as possible. Selecting a resource held by such an entity to be the victim resource of a deadlock would cause the possessory entity to suffer an unacceptable penalty. Similarly, a resource may not be a good victim candidate when the possessory entity holding the resource has been running for a very long time.

To address these concerns, techniques are provided for selecting which candidate of a plurality of candidates involved in a deadlock is to be the "victim" used to resolve a deadlock. The techniques involve selecting the victim based on one or more factors, which may include:

1) the value of a victim indicator, associated with each candidate, which indicates whether the held resource(s) may be released or the requested resource(s) maybe postponed;

2) the category and/or priority assigned to resources; and 3) the length of time a possessory entity has been running or the resource has been held.

Once a victim has been selected, various techniques may be used to resolve the deadlock. For example, one technique involves rolling back the entity that holds the resource that is selected to be the victim resource. Other techniques include causing the request for the victim resource to fail, and postponing the request for the victim resource. While various deadlock resolution techniques may be used with the victim selection techniques described herein, the present invention is not limited to any particular technique for resolving deadlocks once a victim has been selected.

Can-Be-Victim Flag

In the embodiments described below, the first pass of the victim selection operations is based on whether the CAN-BE-VICTIM flag is set to "true" or "false". A CAN-BE-VICTIM flag of a candidate is a value that indicates whether the candidate is allowed to be selected as a victim. This CAN-BE-VICTIM flag can be set in a variety of ways. For example, the values of CAN-BE-VICTIM flags could be set by a user, by an installation, or could be set based on a service policy, where a user and an installation negotiate the service policy. Furthermore, CAN-BE-VICTIM flags could be associated with, among other things, processes, transactions, or resources. These lists of ways for setting the CAN-BE-VICTIM flag, and the types of entities with which the CAN-BE-VICTIM flags may be associated, are not intended to be exhaustive lists.

Resource Priority

There are several techniques that may be used for computing resource priority. For example, the priority of a resource may be a static numeric value, which is assigned at the start of the application, or it may be a dynamic numeric value that changes during the life of a resource depending upon the resource usage and status of the possessory entity that is holding the resource. In an embodiment that uses both static and dynamic priority, the dynamic priority value of the resource may be added to the static priority value for the resource to create a composite priority.

In one embodiment, a static priority is established as a numeric value assigned to a resource based on the functional significance of the resource to the application.

The dynamic priority of a held resource may be established by computing the amount of contention for that resource. The amount of contention may be, for example, a sliding value that is initially set to some predetermined value and increased when the access pattern for a resource rises above a threshold. Likewise, the amount of contention would be decreased when the access pattern for a resource falls below a threshold. The thresholds may be the same or different values. Furthermore, there may be several thresholds where each threshold correlates to a different amount that the amount of contention value would be increased or decreased.

Furthermore, the dynamic priority of a resource may be determined by looking at all the resources already owned or potentially owned by its possessory entity. For example, the dynamic priority of a resource held by a possessory entity may be established by taking the average of the dynamic priorities of all resources held by that possessory entity. This approach of averaging the dynamic priorities to derive a dynamic priority may be used to ensure that a victim resource will not belong to a possessory entity that already owns several high priority resources.

Input values used for computing the static priority and the dynamic priority may be set by a user, by an installation, or may be set based on a service policy, where a user and an installation negotiate the service policy. These are just a few examples of techniques that may be used for computing resource priority.

Techniques for Selecting a Victim

According to one embodiment, a victim resource is selected using a three-pass filtering operation as follows:

PASS 1. During the first pass, choose the set of resources in the deadlock graph that have the CAN-BE-VICTIM flag set. If the graph has just one resource with the CAN-BE-VICTIM flag set then this resource is the victim, otherwise go to pass 2.

PASS 2. During the second pass, partition the set of resources obtained from pass 1 into subsets that contain resources that have the same priority. Alternatively, the set from pass 1 may be partitioned in terms of priority range. Once the resources have been partitioned according to priority, the subset of resources that has the least priority is chosen. If the least priority subset has just one resource, then the single resource is the victim, else go to pass 3.

Figure 1B:
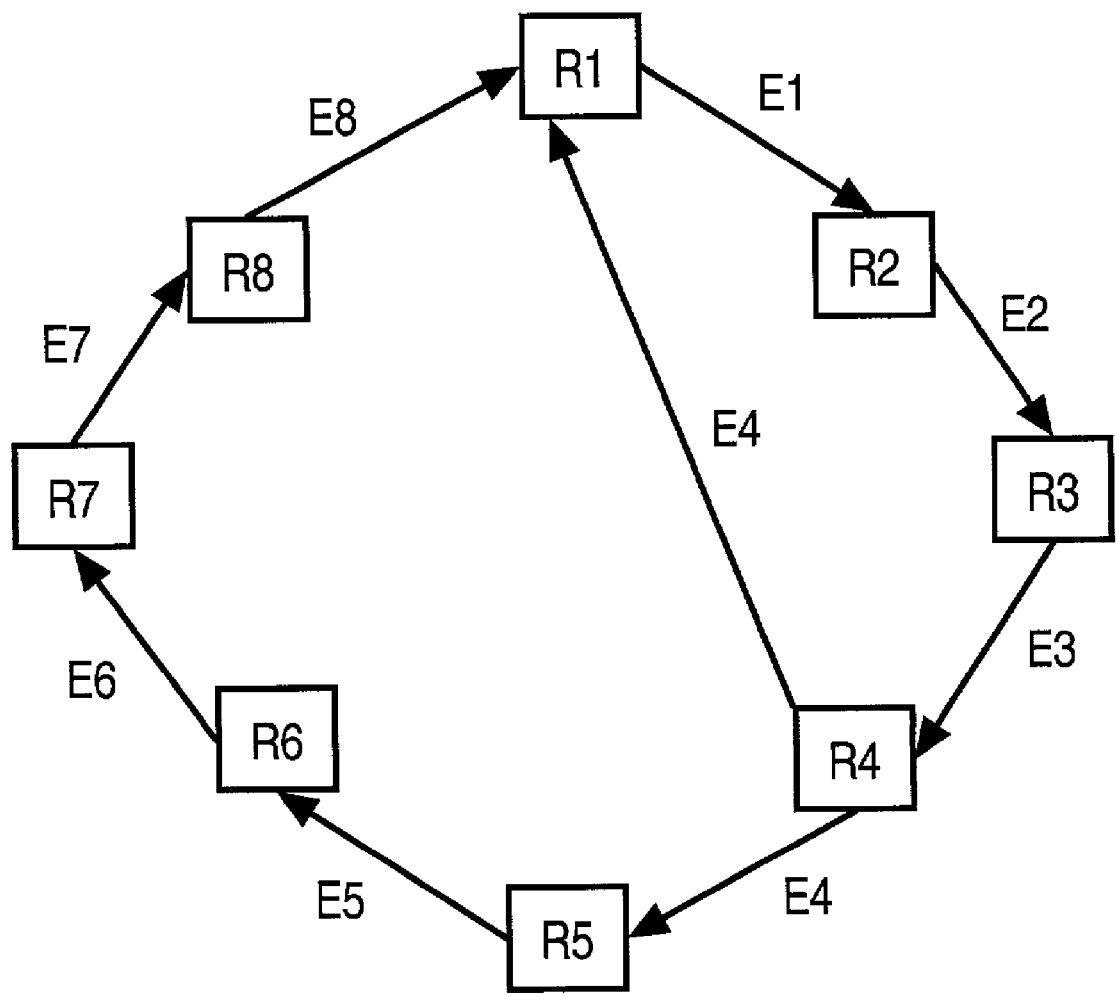
FIG. 1b is a block diagram depicting a wait-for graph.

To illustrate pass 2, assume that pass 1 is performed the resources R1 to R8 illustrated in FIG. 1b. Assume further that R1, R2, R3, R4, R5, R6, R7, and R8 all have their associated CAN-BE-VICTIM flag set. Based on the priority scheme (i.e. numeric value, or range), during pass 2, the set of resources remaining after pass 1 is partitioned to produce the following three sets:

S0={R1, R5, R8}

S1={R2, R3}

S2={R4, R6, R7} where S0>S1>S2 and ">" denotes the "greater priority/priority range". In this scenario, set S2={R4, R6 and R7} would be selected during pass 2. Because the selected set contains more than one candidate, the selection process proceeds to pass 3.

As mentioned above, the priority of a resource can be some static numeric value assigned to it at the start of the application and/or it can be some dynamic numeric value that keeps changing during the life of a held resource depending upon its usage and the status of its possessory entity.

PASS 3: Pass three is performed on the resources that remain after pass 2 (i.e. the resources in the least priority set). During pass 3, the running time for the possessory entity of each resource in the set is determined. The resource that has the shortest running time for its possessory entity is selected as the victim.

Variations

In the embodiments described above, a deadlock victim is selected by performing three passes, where each pass filters the set of deadlock victim candidates based on a different factor. However, the specific number of passes, and the specific factors used during those passes, may vary from implementation to implementation. For example, the victim candidate set may be filtered based on the running time before the victim candidate set is filtered based on resource priority.

Similarly, the techniques for establishing a priority value for victim resources may vary from implementation to implementation, as well as the techniques used to determine how long a possessory entity has been running. For example, if the possessory entity is a process, the time that the process has been running may be determined by making a call to the operation system. On the other hand, if the possessory entity is a transaction, the technique used to obtain the running time of the transaction will depend on how transactions are implemented in the system to which the transaction belongs.

Furthermore, the filtering may be performed in a single pass that takes into account multiple factors, where the factors are given different weights. For example, one pass may filter based on both resource priority and running time, where a candidate with a relatively high priority resource may still be selected as the victim if the running time of the other candidates is significantly greater than that candidate. Other factors may include, for example, the type of the possessory entity, and the identity of the user associated with a possessory entity.

Another possible technique is to apply the algorithm to potential deadlocks where the entities are requesting resources but have not yet acquired the resources. A wait-for graph of how the resources will be allocated may be constructed and analyzed. If a potential deadlock is detected, the techniques described herein maybe applied to determine which resource requests to postpone.

Hardware Overview

Figure 2:
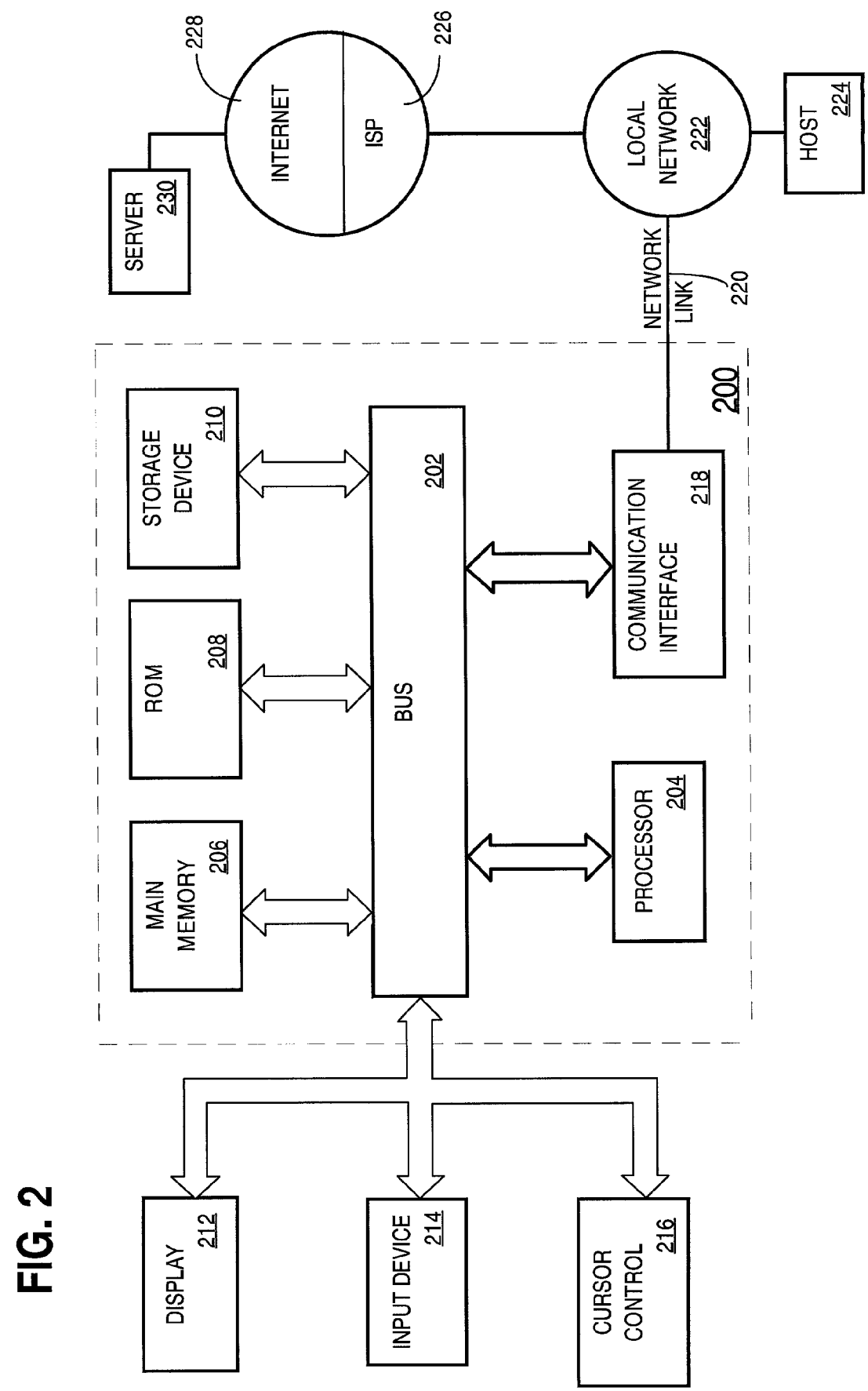
FIG. 2 is a block diagram depicting a computer system upon which an embodiment of the present invention may be implemented.

FIG. 2 is a block diagram that illustrates a computer system 200 upon which an embodiment of the present invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for selecting a good candidate to resolve a deadlock or potential deadlock. Instructions for selecting such a candidate may be read into main memory 206 from a computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such medium may take many forms, including but not limited to, storage media (non-volatile media, volatile media) and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit requested code for an application program through Internet 228, ISP 226, local network 222 and communication interface 218. In accordance with the invention, one such downloaded application provides for providing information about the participants in a distributed operation as described herein.

The received code may be executed by processor 204 as it is received, and/or stored in storage device 210, or other non-volatile storage for later execution. In this manner, computer system 200 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for selecting a victim to be used during resolution of a deadlock, the method comprising the steps of:
    initially establishing a plurality of resources involved in said deadlock as a set of candidates to be said victim;
    performing a first filtering pass that removes candidates from said set based on CAN-BE-VICTIM flags associated with said candidates;
    if more than a single candidate remains in said set after said first filtering pass, then performing a second filtering pass that removes candidates from said set based on priorities associated with said candidates; and
    if more than a single candidate remains in said set after said second filtering pass, then performing a third filtering pass that removes candidates from said set based on runtimes associated with possessory entities associated with said candidates; and
    when said set has been filtered to include a single candidate, selecting said candidate as said victim.

2. The method of claim 1 wherein at least a portion of the priority of a given resource is established dynamically.

3. The method of claim 2 wherein said portion is established based on which other resources are held by a possessory entity associated with the given resource.

4. The method of claim 1 wherein at least a portion of the priority of a given resource is established statically.

5. The method of claim 4 wherein said portion is established based on the type of the given resource.

6. A method for selecting a victim to be used during resolution of a deadlock, the method comprising the steps of:
    initially establishing a plurality of candidates involved in said deadlock as candidates to be said victim;
    filtering said plurality of candidates based on one or more factors until a single candidate remains as a candidate to be said victim, wherein the step of filtering comprises filtering each candidate of the plurality of candidates by taking into account, for each candidate, at least one factor of the one or more factors;

selecting said single candidate as the victim to be used during resolution of said deadlock; and wherein the step of filtering further includes removing from said plurality of candidates any candidates that have a CAN-BE-VICTIM flag that indicates the candidate cannot be a victim.

7. The method of claim 6 wherein the step of filtering further includes removing from said plurality of candidates all the candidates that are associated with possessory entities have been running for a duration of time that is relatively longer than the duration of time that possessory entities associated with the other candidates have been running.

8. The method of claim 6 wherein the step for filtering further comprises the computer-implemented steps of:

performing a first pass to filter out any candidates that have a CAN-BE-VICTIM flag indicating that one is not candidate for termination;

if more than one candidate is left after performing the first pass, then performing a second pass to filter out any candidates whose resource priority is higher than the resource priority of at least one of the other candidates;

if more than one candidate is left after performing the second pass, then performing a third pass to filter out all the candidates except the candidate that has been running for the shortest duration of time.

9. The method of claim 6 wherein the step of filtering includes filtering based on priorities established for said candidates.

10. The method of claim 9 wherein at least a portion of the priority of a given candidate is established dynamically.

11. The method of claim 10 wherein said portion is established based on which resources other than said candidate are held by a possessory entity associated with the given candidate.

12. The method of claim 9 wherein at least a portion of the priority of a given candidate is established statically.

13. The method of claim 12 wherein said portion is established based on the type of the given candidate.

14. A method for selecting a victim to be used during resolution of a deadlock, the method comprising the steps of:

initially establishing a plurality of candidates involved in said deadlock as candidates to be said victim, wherein the plurality of candidates are a plurality of possessory entities involved in said deadlock;

filtering said plurality of candidates based on one or more factors until a single candidate remains as a candidate to be said victim, wherein the step of filtering comprises filtering each candidate of the plurality of candidates by taking into account, for each candidate, at least one factor of the one or more factors;

selecting said single candidate as the victim to be used during resolution of said deadlock; and wherein the step of filtering further includes removing from said plurality of candidates the candidates holding at least one resource whose resource priority is higher than the resource priority of at least one resource held by at least one of the other candidates.

15. The method of claim 14 wherein the step of filtering further includes removing from said plurality of candidates all the candidates that are associated with possessory entities have been running for a duration of time that is relatively longer than the duration of time that possessory entities associated with the other candidates have been running.

16. The method of claim 14 wherein the step for filtering further comprises the computer-implemented steps of:

performing a first pass to filter out any candidates that have a CAN-BE-VICTIM flag indicating that one is not candidate for termination;

if more than one candidate is left after performing the first pass, then performing a second pass to filter out any candidates whose resource priority is higher than the resource priority of at least one of the other candidates;

if more than one candidate is left after performing the second pass, then performing a third pass to filter out all the candidates except the candidate that has been running for the shortest duration of time.

17. A computer-readable storage medium carrying instructions for selecting a victim to be used during resolution of a deadlock, the computer-readable medium comprising instructions for performing the steps of:

initially establishing a plurality of resources involved in said deadlock as a set of candidates to be said victim;

performing a first filtering pass that removes candidates from said set based on CAN-BE-VICTIM flags associated with said candidates;

if more than a single candidate remains in said set after said first filtering pass, then performing a second filtering pass that removes candidates from said set based on priorities associated with said candidates; and if more than a single candidate remains in said set after said second filtering pass, then performing a third filtering pass that removes candidates from said set based on runtimes associated with possessory entities associated with said candidates; and when said set has been filtered to include a single candidate, selecting said candidate as said victim.

18. The computer-readable storage medium of claim 17 wherein at least a portion of the priority of a given resource is established dynamically.

19. The computer-readable storage medium of claim 18 wherein said portion is established based on which other resources are held by a possessory entity associated with the given resource.

20. The computer-readable storage medium of claim 17 wherein at least a portion of the priority of a given resource is established statically.

21. The computer-readable storage medium of claim 20 wherein said portion is established based on the type of the given resource.

22. A computer-readable storage medium carrying instructions for selecting a victim to be used during resolution of a deadlock, the computer-readable medium carrying instructions for performing the steps of:

initially establishing a plurality of candidates involved in said deadlock as candidates to be said victim;

filtering said plurality of candidates based on one or more factors until a single candidate remains as a candidate to be said victim, wherein the step of filtering comprises filtering each candidate of the plurality of candidates by taking into account, for each candidate, at least one factor of the one or more factors;

selecting said single candidate as the victim to be used during resolution of said deadlock; and wherein the step of filtering further includes removing from said plurality of candidates any candidates that have a CAN-BE-VICTIM flag that indicates the candidate cannot be a victim.

23. The computer-readable storage medium of claim 22 wherein the step of filtering further includes removing from said plurality of candidates all the candidates that are associated with possessory entities have been running for a duration of time that is relatively longer than the duration of time that possessory entities associated with the other candidates have been running.

24. The computer-readable storage medium of claim 22 wherein the step for filtering further comprises the computer-implemented steps of:

performing a first pass to filter out any candidates that have a CAN-BE-VICTIM flag indicating that one is not candidate for termination;

if more than one candidate is left after performing the first pass, then performing a second pass to filter out any candidates whose resource priority is higher than the resource priority of at least one of the other candidates;

if more than one candidate is left after performing the second pass, then performing a third pass to filter out all the candidates except the candidate that has been running for the shortest duration of time.

25. The computer-readable storage medium of claim 22 wherein the step of filtering includes filtering based on priorities established for said candidates.

26. The computer-readable storage medium of claim 25 wherein at least a portion of the priority of a given candidate is established dynamically.

27. The computer-readable storage medium of claim 26 wherein said portion is established based on which resources other than said candidate are held by a possessory entity associated with the given candidate.

28. The computer-readable storage medium of claim 25 wherein at least a portion of the priority of a given candidate is established statically.

29. The computer-readable storage medium of claim 28 wherein said portion is established based on the type of the given candidate.

30. A computer-readable storage medium carrying instructions for selecting a victim to be used during resolution of a deadlock, the computer-readable medium carrying instructions for performing the steps of:

initially establishing a plurality of candidates involved in said deadlock as candidates to be said victim, wherein the plurality of candidates are a plurality of possessory entities involved in said deadlock;

filtering said plurality of candidates based on one or more factors until a single candidate remains as a candidate to be said victim, wherein the step of filtering comprises filtering each candidate of the plurality of candidates by taking into account, for each candidate, at least one factor of the one or more factors;

selecting said single candidate as the victim to be used during resolution of said deadlock; and wherein the step of filtering further includes removing from said plurality of candidates the candidates holding at least one resource whose resource priority is higher than the resource priority of at least one resource held by at least one of the other candidates.

31. The computer-readable storage medium of claim 30 wherein the step of filtering further includes removing from said plurality of candidates all the candidates that are associated with possessory entities have been running for a duration of time that is relatively longer than the duration of time that possessory entities associated with the other candidates have been running.

32. The computer-readable storage medium of claim 30 wherein the step for filtering further comprises the computer-implemented steps of:

performing a first pass to filter out any candidates that have a CAN-BE-VICTIM flag indicating that one is not candidate for termination;

if more than one candidate is left after performing the first pass, then performing a second pass to filter out any candidates whose resource priority is higher than the resource priority of at least one of the other candidates;

if more than one candidate is left after performing the second pass, then performing a third pass to filter out all the candidates except the candidate that has been running for the shortest duration of time.

* * * * *